United States Patent
Abdel Shahid (10) Patent No.: US 10,873,932 B2
(45) Date of Patent: Dec. 22, 2020

(54) DYNAMIC TRANSMISSION MODE SWITCHING ON THE PHYSICAL LAYER

(71) Applicant: T-Mobile USA, Inc., Bellevue, WA (US)

(72) Inventor: Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/034,280

(22) Filed: Jul. 12, 2018

(65) Prior Publication Data

US 2019/0166588 A1 May 30, 2019

Related U.S. Application Data (60) Provisional application No. 62/591,965, filed on Nov. 29, 2017.

(51) Int. Cl.
*H04W 72/04* (2009.01)
*H04W 72/08* (2009.01)
(Continued)

(52) U.S. Cl.
CPC ......... *H04W 72/042* (2013.01); *H04L 5/0053* (2013.01); *H04W 72/085* (2013.01);
(Continued)

(58) Field of Classification Search
CPC .................. H04W 72/042; H04W 72/085
See application file for complete search history.

(56) References Cited

U.S. PATENT DOCUMENTS

2012/0182950 A1\* 7/2012 Chung .................. H04L 5/0053 370/329
2013/0102342 A1\* 4/2013 Tesanovic ............ H04B 7/0623 455/507

(Continued)

FOREIGN PATENT DOCUMENTS

WO WO2013071486 5/2013
WO WO2017038454 3/2017

OTHER PUBLICATIONS

LG Electronics, Blinde Detection under DMRS based transmission mode, SGpp TSG-RAN WG4 Meeting #72, Dresden, Germany, Aug. 11, 2014, 6 pages.

(Continued)

*Primary Examiner* — Yemane Mesfin
*Assistant Examiner* — Henry Baron
(74) *Attorney, Agent, or Firm* — Lee & Hayes, P.C.

(57) ABSTRACT

User equipment (UE) can determine a plurality of Downlink Control Information (DCI) formats that correspond to a plurality of transmission modes supported by a base station. When the UE receives a subframe of a radio frame from the base station, it can perform a blind search at the physical layer for a unique identifier associated with the UE in DCI of the subframe using at least one of the plurality of DCI formats. When the UE determines that the unique identifier was found during the blind search using a particular DCI format, it can identify a particular transmission mode that corresponds to the particular DCI format. The UE can then interpret data for the UE in the subframe according to that particular transmission mode.

20 Claims, 6 Drawing Sheets

(51) Int. Cl.
  *H04L 5/00* (2006.01)
  *H04L 29/08* (2006.01)
  *H04W 88/08* (2009.01)
  *H04W 76/27* (2018.01)
  *H04W 88/02* (2009.01)

(52) U.S. Cl.
  CPC .......... *H04L 5/0044* (2013.01); *H04L 69/323* (2013.01); *H04W 76/27* (2018.02); *H04W 88/02* (2013.01); *H04W 88/08* (2013.01)

(56) References Cited

U.S. PATENT DOCUMENTS

2014/0050189 A1\* 2/2014 Shimezawa ............ H04B 7/024
  370/329
2016/0197671 A1\* 7/2016 Hwang ................ H04B 7/2615
  370/330

OTHER PUBLICATIONS

The PCT Search Report and Written Opinion dated Feb. 22, 2019 for PCT Application No. PCT/US2018/059497, 14 pages.

\* cited by examiner

DYNAMIC TRANSMISSION MODE SWITCHING ON THE PHYSICAL LAYER

RELATED APPLICATIONS

This U.S. patent application claims priority to provisional U.S. Patent Application No. 62/591,965, entitled "DYNAMIC SWITCHING OF TRANSMISSION MODES 9 AND 4 ON THE PHYSICAL LAYER," filed on Nov. 29, 2017, the entirety of which is incorporated herein by reference.

BACKGROUND

In a telecommunication network, user equipment (UE) can wirelessly connect to a base station in order to engage in voice calls, video calls, data transfers, or other types of communications. For example, a UE can connect to an eNode B (eNB) of a Long Term Evolution (LTE) network.

A base station can transmit radio frames that include data for a UE based on a selected transmission mode. The base station may select a particular transmission mode for a UE's data in a radio frame based on signal quality metrics reported by the UE, as some transmission modes can provide higher throughput to the UE than other transmission modes in different situations. However, the UE may only be able to correctly interpret a received radio frame if it has information about which transmission mode the base station actually selected and used for the UE's data in that radio frame.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

A telecommunication network can include base stations, such as eNode Bs (eNBs) in a Long Term Evolution (LTE) network, that wirelessly communicate with user equipment (UE) in cells serviced by the base stations. Some base stations can be configured to support multiple transmission modes. For example, base stations can be set up to select between 3GPP's Transmission Mode Four (TM4) or Transmission Mode Nine (TM9) when transmitting data for individual UEs in radio frames. In many cases, TM4 can lead to higher throughput than TM9 when a UE is closer to the base station, whereas TM9 can lead to higher throughput than TM4 when the UE is farther away from the base station.

A base station can select which transmission mode to use for a UE's data in one or more radio frames based on signal quality metrics reported by the UE. For example, a UE may report that it is receiving data from the base station at a good signal quality, which often occurs when the UE is relatively close to the base station and is considered to be "near-cell" or "mid-cell." In this situation, the base station may choose to use TM4 for the UE's data in the next radio frame. However, if the UE reports that it is receiving data a lower signal quality, which can often occur if the UE is located at the edge of a cell, the base station may instead choose to use TM9 for the UE's data in the next radio frame, because TM9 can often lead to higher throughput at the cell edge than TM4.

In some existing systems, when a base station changes the transmission mode it is using for a particular UE, the base station informs the UE about the change in a Radio Resource Control (RRC) Reconfiguration message so that the UE knows which transmission mode to use when interpreting data in the radio frame. RRC messages are sent in data packets according to the Packet Data Convergence Protocol (PDCP), and are interpreted by UEs at the network layer. Accordingly, when an RRC message indicates a change to the transmission mode, a UE must process the RRC message at the network layer to discover the change and then pass information about the new transmission mode through the medium access control (MAC) layer to the physical layer so that received radio frames can be interpreted at the physical layer using the correct transmission mode.

However, in some cases network conditions experienced by a UE can change rapidly, and processing RRC messages that signal transmission mode changes can take too long for a UE to keep up. For example, when a UE is inside a vehicle driving within a cell, it may report poor signal strength while physically located near the cell edge. The base station may accordingly select TM9 for the next radio frame. However, by the time the UE would be able to receive and process an RRC Reconfiguration message from the base station indicating that the base station is now using TM9 for the UE, the UE may have been driven by the vehicle to a location closer to the base station. Accordingly, at that new position the UE may report better signal strength, and the base station may choose to use TM4 for the next radio frame. However, the UE would have just switched to TM9 according the RRC Reconfiguration message, and as such may not be able to keep up with the changing transmission modes.

This disclosure describes systems and processes for a UE to dynamically determine at the physical layer which transmission mode to use when interpreting a radio frame. Determining the transmission mode directly at the physical layer during interpretation of a radio frame can be faster than separately determining and implementing a transmission mode change in part through higher layers based on RRC message signaling.

In particular, a base station can use an RRC message to initially inform a UE about which transmission modes the base station supports. Each supported transmission mode can correspond to a different Downlink Control Information (DCI) format. The UE can receive this information about which transmission modes a base station supports, and which DCI formats correspond to those transmission modes, prior to interpreting subsequent radio frames. When a UE begins to receive subframes of a new radio frame, the UE can attempt to find the UE's unique identifier within DCI of individual subframes using the different DCI formats that correspond to the different transmission modes supported by the base station. Once the UE successfully finds its identifier in a subframe's DCI using one of the DCI formats, the UE can identify the transmission mode that corresponds to that DCI format and then interpret the UE's data in the remainder of the frame according to that transmission mode.

A UE being able to dynamically determine at the physical layer which transmission mode to use when interpreting a radio frame can improve the quality and retainability of individual communication sessions. For example, a voice call may be at risk of being dropped when a UE is at the edge of a cell and has a poor connection to a base station. In the existing systems described above, in which a base station must signal every change to the specific transmission mode it is using in an RRC Reconfiguration message, the voice call may be dropped by the time the UE receives a new RRC Reconfiguration message, analyzes it at higher layers to determine the specific transmission mode now being used, and then propagates information down to the physical layer that causes data to be interpreted using that new specific transmission mode. In contrast, when the UE can dynamically determine at the physical layer which transmission mode to use when interpreting a radio frame as described herein, the UE can directly use that transmission mode at the physical layer to interpret the received data without waiting for a message to be interpreted at a higher layer, thereby increasing the chances that the call will not be dropped.

Example Environment

Figure 1:
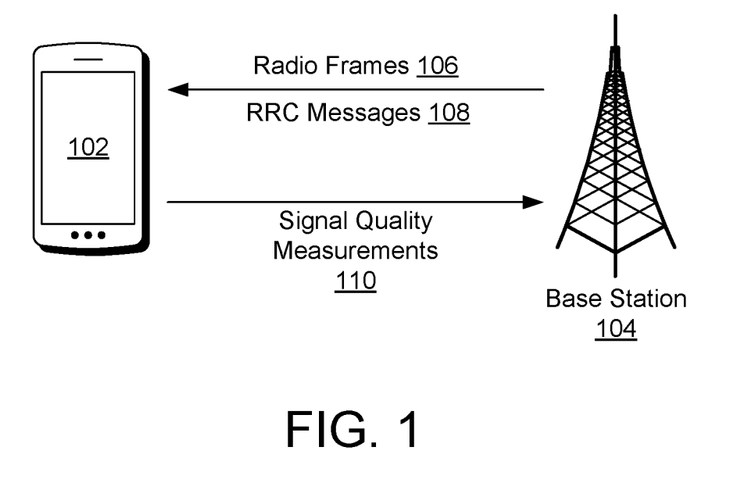
FIG. 1 depicts user equipment (UE) in communication with a base station of a telecommunications network.

FIG. 1 depicts user equipment (UE) 102 in communication with a base station 104 of a telecommunications network. A UE 102 can be any device that can wirelessly connect to a base station 104 in order to engage in communication sessions for voice calls, video calls, data transfers, or any other type of communication via the telecommunication network. For example, a UE 102 can be a smart phone, a cellular phone, a personal digital assistant (PDA), a personal computer (PC), a laptop, a desktop, a workstation, a media player, a tablet, a gaming device, a smart watch, or any other type of computing or communication device. An example UE 102 is illustrated in greater detail in FIG. 6, and is described in detail below with reference to that figure.

A base station 104 can provide network access to UEs 102 within a cell. A base station 104 can be based on, and/or provide network access through, one or more wireless access technologies. Such wireless access technologies can include fifth generation (5G) technology, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, and WiFi® technology. For example, in an LTE network a base station 104 can be an eNode B (eNB). An example base station 104 is illustrated in greater detail in FIG. 7, and is described in detail below with reference to that figure.

Various types of data can be sent between the UE 102 and the base station 104. For example, the base station 104 can transmit a series of radio frames 106 that can be received by one or more UEs 102. The base station 104 can send Radio Resource Control (RRC) messages 108 to UEs 102 in at least some of the radio frames 106, as will be described in more detail below. The UE 102 can also send data to the base station 104, including signal quality measurements 110. Signal quality measurements 110 can indicate how well the UE 102 is receiving data from the base station 104. For example, signal quality measurements 110 can include a UE's indications of received signal quality and/or received signal strength, such as a channel quality indicator (CQI), signal to interference and noise ratio (SINR), or any other signal quality metric.

UEs 102 and base stations 104 can be configured to support multiple transmission modes at the physical layer, such as transmission modes defined by 3GPP standards. For example, UEs 102 and base stations 104 can be configured to support 3GPP's Transmission Mode Four (TM4) and 3GPP's Transmission Mode Nine (TM9). In some cases, the transmission modes a UE 102 or base station 104 supports can depend in part on the number of antennas it can use to send or receive data. For example, TM4 can be used for closed-loop spatial multiplexing for transmissions by multiple-input multiple-output (MIMO) devices with multiple antennas. TM9 can also be used for spatial multiplexing at up to eight layers by some MIMO devices.

Some transmission modes can provide greater throughput from a base station 104 to a UE 102 in certain situations. For example, in some cases TM9 can provide a throughput improvement of approximately 15% percent for UEs 102 near the edge of a cell compared to TM4, while TM4 can provide a throughput improvement of approximately 10% over TM9 for "mid-cell" UEs 102 closer to the base station 104 and a throughput improvement of approximately 30% over TM9 for "near-cell" UEs 102 that are very close to the base station 104. A base station 104 can accordingly choose one of the multiple transmission modes it supports for a particular UE 102 based on the signal quality measurements 110 reported by that UE 102. For example, if a UE 102 reports low signal quality measurements 110, it may indicate that the UE 102 is on the edge of the cell, and the base station 104 can respond by selecting TM9. However, if the UE 102 reports higher signal quality measurements 110, it may indicate that the UE 102 is at "mid-cell" or "near-cell," and the base station 104 can respond by selecting TM4.

A base station 104 can select the transmission mode to use for a UE 102 for every group of one or more radio frames 106. For example, a base station 104 can continue using a previous transmission mode or change to a different transmission mode at every radio frame 106, at every ten radio frames 106, or at intervals corresponding to any other number of radio frames 106.

Figure 2:
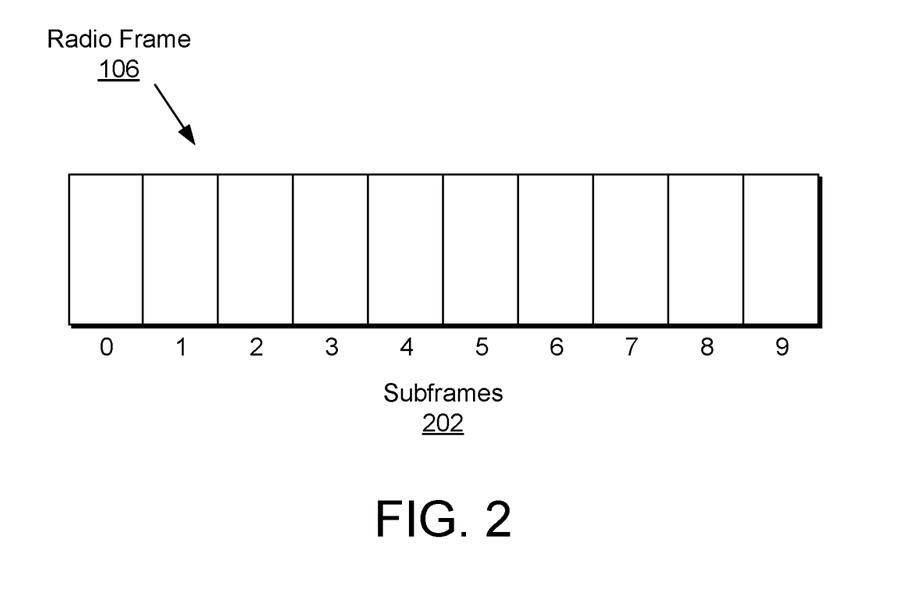
FIG. 2 depicts an exemplary radio frame.

FIG. 2 depicts an exemplary radio frame 106. As noted above, a base station 104 can transmit a series of radio frames 106 that can be received by one or more UEs 102. Each radio frame 106 can include a plurality of subframes 202. In some examples, one radio frame 106 can have a duration of ten milliseconds, and include ten distinct subframes 202 that each have a duration of one millisecond. The subframes 202 can each be identified by a subframe number. For example, a single radio frame 106 can include ten subframes 202 identified as subframe 0, subframe 1, . . . , and subframe 9.

Figure 3:
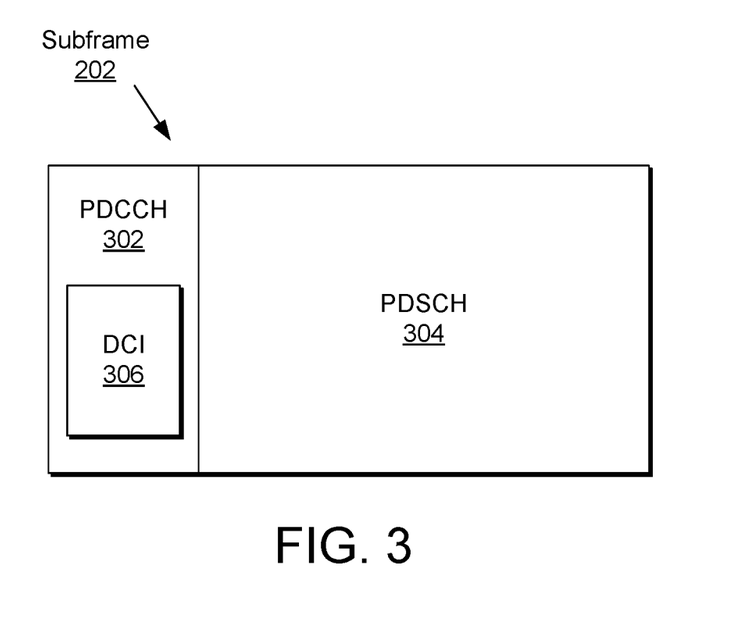
FIG. 3 depicts an exemplary subframe.

FIG. 3 depicts an exemplary subframe 202. A subframe 202 can include data in a Physical Downlink Control Channel (PDCCH) 302 and data in a Physical Downlink Shared Channel (PDSCH) 304.

The PDCCH 302 can be positioned at the beginning of a subframe 202, and include information that UEs 102 can use to interpret and/or find data in the PDSCH 304 that follows the PDCCH 302 in the subframe 202. For example, the PDCCH 302 can include Downlink Control Information (DCI) 306, as will be discussed further below.

A subframe's PDSCH 304 can include data for one or more UEs 102. For instance, the PDSCH 304 can be divided into multiple resource blocks located at different frequencies, and data for a particular UE 102 can be located at one or more of those resource blocks. A base station 104 can encode data for a particular UE 102 into a subframe's PDSCH 304 differently depending on which transmission mode it is using for that UE 102. As discussed above, a base station 104 can change the transmission mode it uses for a particular UE 102 as frequently as every radio frame 106. However, the base station 104 can use a consistent transmission mode for a UE 102 during each subframe 202 of a particular radio frame 106.

In the PDCCH 302, DCI 306 can include information that instructs UEs 102 how to locate and/or decode data in resource blocks of the PDSCH 304 that is intended for those UEs 102. For instance, for a particular UE 102, DCI 306 can indicate the location and/or number of resource blocks in the PDSCH 304 that are intended for that particular UE 102, modulation and coding schemes used to encode data in those resource blocks, number of layers, and/or other types of information.

Because a subframe's PDSCH 304 can include data intended for more than one UE 102, DCI 306 in the subframe's PDCCH 302 can be marked in part using unique identifiers for those UEs 102 to distinguish between DCI 306 intended for different UEs 102. In some examples, the unique identifiers can be scrambled in the DCI 306 with a cyclic redundancy check (CRC), such that individual UEs 102 can only descramble the portion of the DCI 306 marked with their unique identifier.

In some examples, a UE's unique identifier can be a cell-radio network temporary identifier (C-RNTI) that is assigned to the UE 102 by a base station 104 when the UE 102 initially connects to that base station 104. As such, DCI 306 within subframes 202 transmitted by a base station 104 can be marked with C-RNTIs to identify DCI 306 for corresponding UEs 102. A particular UE 102 can accordingly use DCI 306 that is marked with its C-RNTI to locate and interpret resource blocks in the PDSCH 304 that contain data for that particular UE 102.

When a UE 102 receives a new subframe 202 from a base station 104, it may not know whether that particular subframe 202 contains any data for the UE 102. Accordingly, the UE 102 can perform a blind search of the PDCCH 302 on the physical layer to determine if it contains any DCI 306 marked with the UE's identifier, such as the UE's C-RNTI, as described above. If it does, the UE 102 can use the DCI 306 marked with the UE's identifier to locate and/or decode data in the PDSCH 304 that is intended for that UE 102.

As discussed above, data in the PDSCH 304 for a particular UE 102 can be encoded differently depending on the transmission mode selected for the radio frame 106 by the base station 104 for that UE 102. Each of the multiple transmission modes can correspond to a different DCI format that can be used to encode the DCI 306 in the PDCCH 302. For example, 3GPP's DCI format 2 can be associated with TM4, while 3GPP's DCI format 2C can be associated with TM9. Because the DCI 306 for a particular UE 102 can be encoded using different DCI formats depending on which transmission mode the base station 104 is actually using for the UE 102 in the current radio frame 106, during a blind search of the PDCCH 302 the UE 102 may only be able to identify whether a subframe 202 contains DCI 306 marked with the UE's identifier if the UE 102 uses the correct DCI format to interpret the DCI 306.

A base station 104 can send a UE 102 an RRC message 108, such as an RRC Connection Setup message, RRC Reconfiguration message, or any other RRC message, that identifies which transmission modes are supported by the base station 104. For example, a base station 104 can use an optional field in an RRC Reconfiguration message, such as an "antennaInfo-r10 explicitValue-r10" field, as follows to indicate that the base station 104 supports both TM4 and TM9:

```
antennaInfo-r10 explicitValue-r10 :
{
    transmissionMode-r10 tm4,
    transmissionMode-r10 tm9,
    ue-TransmitAntennaSelection release : NULL
}.
```

The UE 102 can use the information in the RRC message 108 about which transmission modes a base station 104 supports to identify which corresponding DCI formats might be used by the base station 104 in a subframe's PDCCH 302. For example, if a UE 102 receives the RRC Reconfiguration message shown above, which indicates that a base station 104 supports TM4 and TM9, the UE 102 can determine that the base station 104 will use DCI format 2 when it has selected TM4 for the UE 102, and DCI format 2C when it has selected TM9 for the UE 102.

When the UE 102 receives the first subframe 202 of a new radio frame 106, it may not yet know which transmission mode the base station 104 is using for the UE's data in that radio frame 106. However, the UE 102 may know from an earlier RRC message 108 that a base station 104 supports at least two transmission modes, and thus might be using any of at least two DCI formats that correspond to the supported transmission modes. The UE 102 can perform blind searches on the physical layer using DCI formats corresponding to the supported transmission modes. to determine if it can find its unique identifier in the subframe's DCI 306. Once the UE 102 finds its unique identifier using one of the DCI formats, the UE 102 can identify the transmission mode that corresponds to that DCI format, and use the identified transmission mode to interpret the subframe 202 and subsequent subframes 202 of the current radio frame 106.

In some examples, the UE 102 can perform blind searches at the physical layer during different DCI formats in an order determined by the order of the transmission modes listed in a base station's RRC message 108. For example, a UE 102 can perform a first blind search using a first DCI format corresponding to a first transmission mode listed in the RRC message 108, and then move on to performing a second blind search using a second DCI format corresponding to a second transmission mode listed in the RRC message 108 if the first blind search is unsuccessful. In other examples, the UE 102 can perform a first blind search using a DCI format that was used to successfully find the UE's identifier in a previous radio frame 106, and then move on to performing one or more other blind searches using different DCI formats if the first blind search was unsuccessful.

Figure 4:
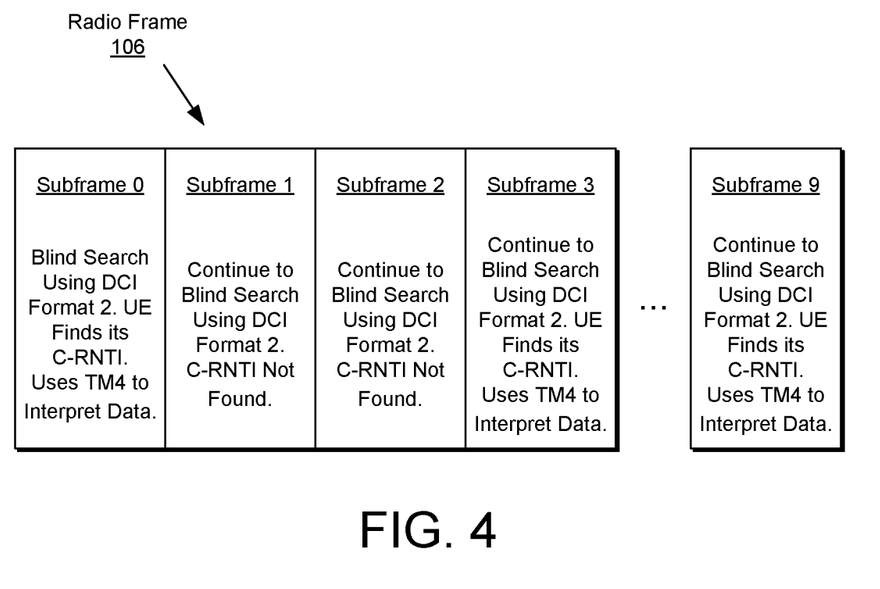
FIG. 4 depicts a first example in which a UE knows that a base station supports Transmission Mode Four (TM4) and Transmission Mode Nine (TM9), and thus might be using either Downlink Control Information (DCI) format 2 or DCI format 2C, and finds its unique identifier using DCI format 2.

FIG. 4 depicts a first example in which a UE 102 knows from an earlier RRC message 108 that a base station 104 supports TM4 and TM9, and thus might be using either DCI format 2 or DCI format 2C. The UE 102 can perform a blind search of the PDCCH 302 in a first subframe 202 using DCI format 2 in an attempt to find the UE's C-RNTI in the DCI

306. In this example, the UE 102 successfully finds its C-RNTI using DCI format 2 in DCI 306 in the first subframe 202. The UE 102 can accordingly use TM4, which corresponds to DCI format 2, to interpret data for the UE 102 in the first subframe's PDSCH 304.

In the example of FIG. 4, because the base station 104 does not change transmission modes between subframes 202 of the same radio frame 106, the UE 102 can continue using DCI format 2 when performing blind searches for its C-RNTI in subsequent subframes 202 of the same radio frame 106, and continue using TM4 to interpret data for the UE 102 in the PDSCH 304 of those subframes 202. If the UE 102 does not find its C-RNTI in the PDCCH 302 of a subsequent subframe 202 using DCI format 2, then there is no data for the UE 102 in that subframe's PDSCH 304 and the UE 102 can wait until the next subframe 202. If the UE 102 does find its C-RNTI in the PDCCH 302 of a subsequent subframe 202 using DCI format 2, the UE 102 can interpret data for the UE 102 in the subframe's PDSCH 304 using TM4.

Figure 5:
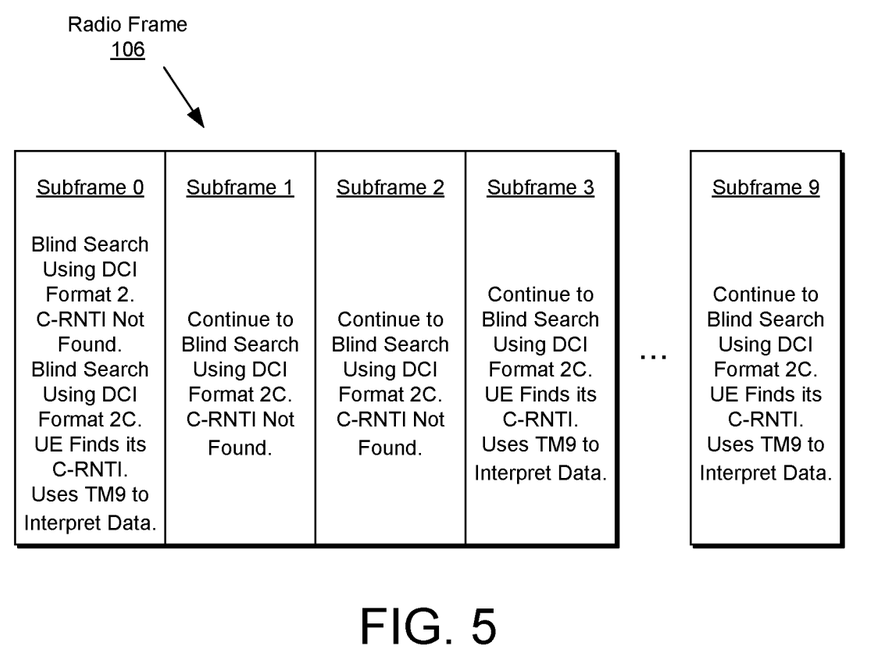
FIG. 5 depicts a second example in which a UE knows that a base station supports TM4 and TM9, and thus might be using either DCI format 2 or DCI format 2C, and finds its unique identifier using DCI format 2C.

FIG. 5 depicts a second example in which a UE 102 knows from an earlier RRC message 108 that a base station 104 supports TM4 and TM9, and thus might be using either DCI format 2 or DCI format 2C. Like FIG. 4, the UE 102 performs a blind search of the PDCCH 302 in a first subframe 202 using DCI format 2 in an attempt to find the UE's C-RNTI in the DCI 306. However, in this example the UE 102 is unable to find its C-RNTI using DCI format 2, but retries the blind search using DCI format 2C and is able to successfully find its C-RNTI in DCI 306 in the first subframe 202 using DCI format 2C. The UE 102 can accordingly use TM9, which corresponds to DCI format 2C, to interpret data for the UE 102 in the first subframe's PDSCH 304.

In the example of FIG. 5, because the base station 104 does not change transmission modes between subframes 202 of the same radio frame 106, the UE 102 can continue using DCI format 2C when performing blind searches for its C-RNTI in subsequent subframes 202 of the same radio frame 106, and continue using TM9 to interpret data for the UE 102 in the PDSCH 304 of those subframes 202. If the UE 102 does not find its C-RNTI in the PDCCH 302 of a subsequent subframe 202 using DCI format 2C, then there is no data for the UE 102 in that subframe's PDSCH 304 and the UE 102 can wait until the next subframe 202. If the UE 102 does find its C-RNTI in the PDCCH 302 of a subsequent subframe 202 using DCI format 2C, the UE 102 can interpret data for the UE 102 in the subframe's PDSCH 304 using TM9.

Although FIGS. 4 and 5 depict examples in which a UE 102 successfully finds its C-RNTI in DCI 306 of a first subframe 202 using either DCI format 2 or DCI format 2C, in some cases the UE 102 may not find its C-RNTI in the first subframe 202 using any of the DCI formats that correspond to transmission modes supported by the base station 104. In these cases, the first subframe 202 may not contain any data for the UE 102, and the UE 102 can retry the blind search for its C-RNTI using the different DCI formats in subsequent subframes 202. For example, if the first data for a UE 102 in a radio frame 106 is contained in the third subframe 202, the UE 102 can perform blind searches for its C-RNTI using both DCI format 2 and DCI format 2C at the first and second subframes 202 without success. However, at the third subframe 202 the UE 102 can successfully find its C-RNTI using one of the DCI formats. The UE 102 can then continue with that successful DCI format and its corresponding transmission mode for the remainder of the subframes 202 in the radio frame 106.

Example Architecture

Figure 6:
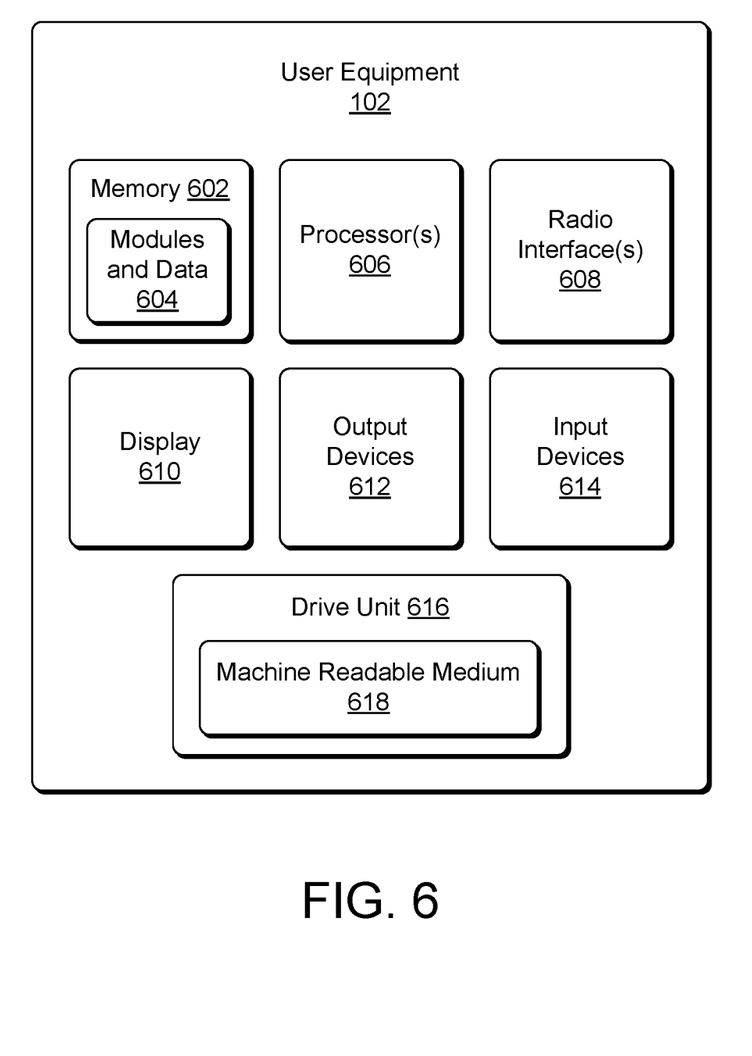
FIG. 6 depicts an example system architecture for a UE.

FIG. 6 depicts an example system architecture for a UE 102, in accordance with various examples. As shown, a UE 102 can include a memory 602 that stores modules and data 604, processor(s) 606, radio interfaces 608, a display 610, output devices 612, input devices 614, and/or a drive unit 616 including a machine readable medium 618.

In various examples, memory 602 can include system memory, which may be volatile (such as RAM), non-volatile (such as ROM, flash memory, etc.) or some combination of the two. Memory 602 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102. In some examples, memory 602 can also include a SIM (subscriber identity module) card, which is a removable memory card used to identify a user of the UE 102 to a telecommunication network.

The modules and data 604 can be utilized by the UE 102 to perform or enable performing any action taken by the UE 102. The modules and data 604 can include a UE platform and applications, and data utilized by the platform and applications. The modules and data 604 can also include information about transmission modes that are supported by a particular base station 104, and information about corresponding DCI formats, which the UE 102 can identify after receiving an RRC message 108 containing information about supported transmission modes from a base station 104.

In various examples, the processor(s) 606 can be a central processing unit (CPU), a graphics processing unit (GPU), or both CPU and GPU, or any other type of processing unit. Each of the one or more processor(s) 606 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 606 may also be responsible for executing all computer applications stored in the memory 602, which can be associated with common types of volatile (RAM) and/or nonvolatile (ROM) memory.

The radio interfaces 608 can include one or more transceivers, modems, receivers, transmitters, antennas, error correction units, symbol coders and decoders, processors, chips, application specific integrated circuits (ASICs), programmable circuit (e.g., field programmable gate arrays), firmware components, and/or other components that perform or assist in exchanging radio frequency (RF) communications with a base station 104. For example, a UE 102 can have one or more radio interfaces 608 that are compatible with a base station 104, such as one or more antennas configured to send data to the base station 104 and/or receive data from the base station 104. In some examples, a processor 606, other modules and data 604, and/or other components of the UE 102 can perform or assist in transmitting and/or receiving data, and/or pre-processing or post-processing of such data, instead of or in combination with the radio interfaces 608.

In particular, the radio interfaces 608, processors 606, and/or other modules and data 604 can perform operations at the physical layer to analyze subframes 202 of radio frames 106 received from a base station 104 as described above. For example, the UE 102 can use its radio interfaces 608, processors 606, and/or other modules and data 604 to perform blind searches at the physical layer for the UE's unique identifier in DCI 306 of a subframe 202 based on one or more DCI formats that correspond to transmission modes supported by the base station 104, and/or interpret data for the UE 102 in the PDSCH 304 of subframes 202 according to an identified transmission mode.

The display 610 can be a liquid crystal display or any other type of display commonly used in UEs 102. For example, display 610 may be a touch-sensitive display screen, and can then also act as an input device or keypad, such as for providing a soft-key keyboard, navigation buttons, or any other type of input.

The output devices 612 can include any sort of output devices known in the art, such as a display 610, speakers, a vibrating mechanism, and/or a tactile feedback mechanism. Output devices 612 can also include ports for one or more peripheral devices, such as headphones, peripheral speakers, and/or a peripheral display.

The input devices 614 can include any sort of input devices known in the art. For example, input devices 614 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 618 can store one or more sets of instructions, such as software or firmware, that embodies any one or more of the methodologies or functions described herein. The instructions can also reside, completely or at least partially, within the memory 602, processor(s) 606, and/or radio interface(s) 608 during execution thereof by the UE 102. The memory 602 and the processor(s) 606 also can constitute machine readable media 618.

Figure 7:
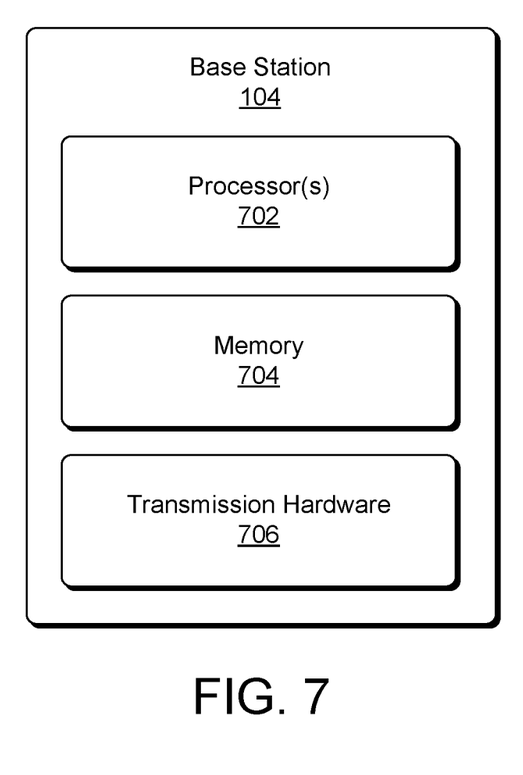
FIG. 7 depicts an example system architecture for a base station.

FIG. 7 depicts an example system architecture for a base station 104, in accordance with various examples. As shown, a base station 104 can include processor(s) 702, memory 704, and transmission hardware 706.

In various examples, the processor(s) 702 can be a central processing unit (CPU), a graphics processing unit (GPU), both CPU and GPU, or any other type of processing unit. Each of the one or more processor(s) 702 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 702 may also be responsible for executing all computer applications stored in the memory 704, which can be associated with common types of volatile (RAM) and/or nonvolatile (ROM) memory.

In various examples, memory 704 can include system memory, which may be volatile (such as RAM), non-volatile (such as ROM, flash memory, etc.) or some combination of the two. The memory 704 can also include additional data storage devices (removable and/or non-removable) such as, for example, magnetic disks, optical disks, or tape. Memory 704 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the base station 104. Any such non-transitory computer-readable media may be part of the base station 104.

The transmission hardware 706 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with one or more UEs 102, transmit data, and monitor the connections. For example, in an LTE network, the transmission hardware 706 can establish and manage connections with one or more UEs 102. The transmission hardware 706 can handle transmissions and protocol exchanges on the baseband, such as a physical LTE connection, as well as the physical (PHY) and media access control (MAC) layers of a protocol stack.

The transmission hardware 706 can support multiple transmission modes, such that the base station 104 can select a particular transmission mode to use for data for particular UEs 102 when transmitting radio frames 106. As discussed above, the base station's selection of a particular transmission mode for a particular UE 102 can be based on signal quality measurements 110 reported by that UE 102 to the base station 104. The processors 702 and/or transmission hardware 706 can accordingly perform operations that prepare and transmit radio frames 106 using the selected transmission modes, including encoding DCI 306 for particular UEs 102 using DCI formats corresponding to the selected transmission modes. The transmission hardware 706 can also be used to transmit RRC messages 108 in radio frames 106 that indicate to UEs 102 which transmission modes are supported by the base station 104.

Example Operations

Figure 8:
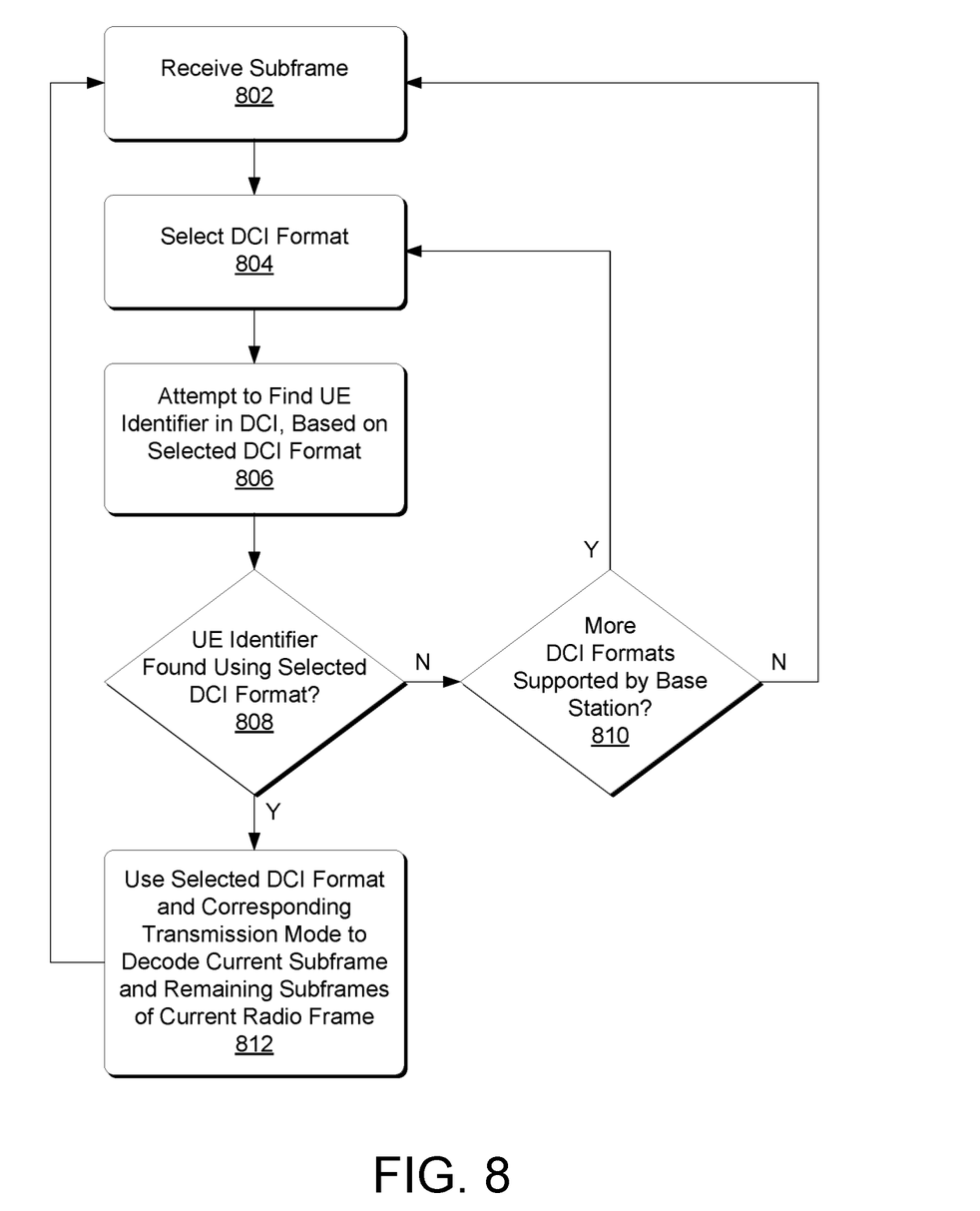
FIG. 8 depicts a flow chart of an exemplary process through which a UE can dynamically identify, at the physical layer, which transmission mode a base station used to prepare data in a radio frame for the UE.

FIG. 8 depicts a flow chart of an exemplary process through which a UE 102 can dynamically identify, at the physical layer, which transmission mode a base station 104 used to prepare data in a radio frame 106 for the UE 102. Prior to using the process of FIG. 8 to analyze subframes 202 of a new radio frame 106, the UE 102 can have received an RRC message 108 from the base station 104 that identifies a plurality of transmission modes that the base station 104 is configured to use. From this RRC message 108, the UE 102 can determine which transmission modes, and which corresponding DCI formats, the base station 104 may be using to prepare data for the UE 102 within radio frames 106.

At block 802, the UE 102 can receive a new subframe 202 of a radio frame 106 from a base station 104. In some examples, this new subframe 202 can be the first subframe 202 of the radio frame 106, although the new subframe 202 can be a later subframe 202 in the radio frame 106 if the UE 102 cannot find its unique identifier in the first subframe 202 using the process of FIG. 8.

At block 804, the UE 102 can select a DCI format to use. As described above, the UE 102 can have previously determined from an RRC message 108 that the base station 104 supports a plurality of transmission modes. The UE 102 can accordingly determine that the base station may be any one of a plurality of DCI formats that correspond to those supported transmission modes, depending on which transmission mode is being used for the current radio frame 106. As such, at block 804, the UE 102 can select one of the DCI formats it has determined the base station 104 may be using for the current radio frame 106.

In some examples, during a first pass through block 804, the UE 102 can select a DCI format corresponding to the first transmission mode listed in the base station's RRC message 108, and then select a different DCI format during each subsequent pass through block 804 in an order corresponding to the order of the transmission modes listed in the base station's RRC message 108. In other examples, during a first pass through block 804, the UE 102 can select a DCI format corresponding to a transmission mode found to have been used in a previous radio frame 106. For example, if the UE 102 determines that TM9 was used in the preceding radio frame 106, the UE 102 can initially select corresponding DCI format 2C during a first pass through block 804 for the current radio frame 106 even if TM9 is listed second in the base station's RRC message 108. During subsequent passes through block 804, the UE 102 can select other DCI formats known to correspond with other transmission modes supported by the base station 104. In still other examples, the UE 102 can select the DCI format randomly or in any other during initial and/or subsequent passes through block 804.

At block 806, the UE 102 can use the currently selected DCI format to perform a blind search at the physical layer of the subframe's PDCCH 302 for DCI 306 marked using a unique identifier for the UE 102, such as its C-RNTI. In some examples, the UE 102 may attempt to descramble the DCI 306 in addition to using the currently selected DCI format when looking for its unique identifier.

At block 808, the UE 102 can determine if it was able to find its unique identifier in the DCI 306 of the subframe 202 using the currently selected DCI format. If the UE 102 was not able to find its unique identifier using the currently selected DCI format, the UE 102 can move to block 810. However, if the UE 102 was able to find its unique identifier using the currently selected DCI format, the UE 102 can move to block 812.

At block 810, when the UE 102 could not find its unique identifier in the DCI 306 of the subframe 202 using the currently selected DCI format during the previous pass through blocks 804 through 808, the UE 102 can determine if there are additional DCI formats the UE 102 has not yet tried at the current subframe 202 that correspond to transmission modes supported by the base station 104. If there are such additional DCI formats that the UE 102 has not yet tried, the UE 102 can return to block 804 and select a different one of those DCI formats. However, if the UE 102 has tried all of the possible DCI formats corresponding to transmission modes supported by the base station 104 during different passes through blocks 804 through 808, and the UE 102 has not found its unique identifier in the DCI 306 of the subframe 202 using any of those DCI formats, the UE 102 can determine that there is no data in the current subframe 202 for the UE 102, and can wait for the first subframe 202 of the next radio frame 106 to begin again at block 802.

At block 812, when the UE 102 has found its unique identifier in the DCI 306 of the subframe 202 using the currently selected DCI format, the UE 102 can identify the transmission mode that corresponds to the currently selected DCI format. For example, if the UE 102 found its unique identifier in the DCI 306 using DCI format 2, the UE 102 can identify TM4 as the corresponding transmission mode. As another example, if the UE 102 found its unique identifier in the DCI 306 using DCI format 2C, the UE 102 can identify TM9 as the corresponding transmission mode. The UE 102 can then use the currently selected DCI format and the corresponding transmission mode to interpret data for the UE 102 in the current subframe 202, and in any subsequent subframe 202 of the current radio frame 106. For example, if the currently selected DCI format and corresponding transmission mode are DCI format 2 and TM4, the UE 102 can continue to use DCI format 2 to perform blind searches for its unique identifier in DCI 306 of subsequent subframes 202 within the same radio frame 106, and if it finds its unique identifier in any subsequent subframe 202 using DCI format 2, it can use TM4 to interpret data for the UE 102 in that subframe's PDSCH 304. After interpreting data in the current subframe 202 and remaining subframes 202 of the current radio frame 106 according to the currently selected DCI format and corresponding transmission mode at block 812, the UE 102 can begin again at block 802 for the next radio frame 106.

Conclusion

As described above, a UE 102 can, at the physical layer, determine from a subframe's DCI 306 which transmission mode was used by a base station 104 to prepare data in the radio frame 106 for the UE 102, by determining which DCI format allows the UE to find its unique identifier in the DCI 306 and identifying which transmission mode corresponds to that DCI format. Accordingly, the UE 102 can directly use that transmission mode identified at the physical layer to interpret data for the UE 102 in the subframe 202 and subsequent subframes 202 of the same radio frame 106. This allows the UE 102 to determine and use the correct transmission mode directly at the physical layer, without waiting for a message to be processed at higher layers that indicates the specific transmission mode used by the base station 104.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:
1. A method, comprising:
receiving, by a user equipment (UE), a Radio Resource Control (RRC) message from a base station indicating a plurality of transmission modes supported by the base station;
determining, by the UE, a plurality of candidate Downlink Control Information (DCI) formats that correspond to the plurality of transmission modes supported by the base station;
receiving, by the UE, a subframe of a radio frame from the base station;
performing, by the UE at a physical layer, at least one blind search for a unique identifier associated with the UE in DCI of the subframe using at least one of the plurality of candidate DCI formats;
identifying, by the UE at the physical layer, a particular DCI format of the plurality of candidate DCI formats that permits the UE, during the at least one blind search, to find the unique identifier in the DCI of the subframe;

identifying, by the UE at the physical layer, a particular transmission mode of the plurality of transmission modes that corresponds to the particular DCI format; and interpreting, by the UE at the physical layer, data for the UE in the subframe according to the particular transmission mode, wherein the RRC message is received by the UE prior to receipt of the subframe.

2. The method of claim 1, further comprising interpreting, by the UE, data for the UE in subsequent subframes of the radio frame according to the particular transmission mode.

3. The method of claim 1, wherein the unique identifier is a cell-radio network temporary identifier (C-RNTI) assigned to the UE by the base station.

4. The method of claim 1, wherein the plurality of transmission modes supported by the base station include transmission mode four (TM4) and transmission mode nine (TM9).

5. The method of claim 4, wherein the UE determines that DCI format 2 corresponds to TM4 and that DCI format 2C corresponds to TM9, and the UE performs the blind search using at least one of DCI format 2 and DCI format 2C.

6. The method of claim 1, further comprising:
determining, by the UE, a signal quality measurement associated with a signal strength and/or signal quality of signals received by the UE from the base station; and
transmitting, by the UE, the signal quality measurement to the base station, such that the base station selects the particular transmission mode for subframes of a subsequent radio frame based at least in part on the signal quality measurement.

7. User equipment (UE), comprising:
one or more processors;
a radio interface;
memory storing computer-executable instructions that, when executed by the one or more processors, cause the UE to perform operations comprising:
receiving a Radio Resource Control (RRC) message from a base station indicating a plurality of transmission modes supported by the base station;
determining a plurality of candidate Downlink Control Information (DCI) formats that correspond to the plurality of transmission modes supported by the base station;
receiving a subframe of a radio frame from the base station;
performing, at a physical layer, at least one blind search for a unique identifier associated with the UE in DCI of the subframe using at least one of the plurality of candidate DCI formats;
identifying, at the physical layer, a particular DCI format of the plurality of candidate DCI formats that permits the UE, during the at least one blind search, to find the unique identifier in the DCI of the subframe;
identifying, at the physical layer, a particular transmission mode of the plurality of transmission modes that corresponds to the particular DCI format; and
interpreting, at the physical layer, data for the UE in the subframe according to the particular transmission mode,
wherein the RRC message is received prior to receipt of the subframe.

8. The UE of claim 7, wherein the operations further comprise interpreting, at the physical layer, data for the UE in subsequent subframes of the radio frame according to the particular transmission mode.

9. The UE of claim 7, wherein the unique identifier is a cell-radio network temporary identifier (C-RNTI) assigned to the UE by the base station.

10. The UE of claim 7, wherein the RRC message indicates that the plurality of transmission modes supported by the base station includes transmission mode four (TM4) and transmission mode nine (TM9), and the UE determines that, within the plurality of candidate DCI formats, DCI format 2 corresponds to TM4 and that DCI format 2C corresponds to TM9.

11. The UE of claim 7, wherein the operations further comprise:
determining a signal quality measurement associated with a signal strength and/or signal quality of signals received by the UE from the base station; and
transmitting the signal quality measurement to the base station, such that the base station selects the particular transmission mode for subframes of a subsequent radio frame based at least in part on the signal quality measurement.

12. One or more non-transitory computer-readable media storing computer-executable instructions that, when executed by one or more processors associated with user equipment (UE), cause the UE to perform operations comprising:
receiving a Radio Resource Control (RRC) message from a base station indicating a plurality of transmission modes supported by the base station;
determining a plurality of candidate Downlink Control Information (DCI) formats that correspond to the plurality of transmission modes supported by the base station;
receiving a subframe of a radio frame from the base station;
performing, at a physical layer, at least one blind search for a unique identifier associated with the UE in DCI of the subframe using at least one of the plurality of candidate DCI formats;
identifying, at the physical layer, a particular DCI format of the plurality of candidate DCI formats that permits the UE, during the at least one blind search, to find the unique identifier in the DCI of the subframe;
identifying, at the physical layer, a particular transmission mode of the plurality of transmission modes that corresponds to the particular DCI format; and
interpreting, at the physical layer, data for the UE in the subframe according to the particular transmission mode,
wherein the RRC message is received prior to receipt of the subframe.

13. The one or more non-transitory computer-readable media of claim 12, wherein the operations further comprise interpreting, at the physical layer, data for the UE in subsequent subframes of the radio frame according to the particular transmission mode.

14. The one or more non-transitory computer-readable media of claim 12, wherein the unique identifier is a cell-radio network temporary identifier (C-RNTI) assigned to the UE by the base station.

15. The one or more non-transitory computer-readable media of claim 12, wherein the RRC message indicates that the plurality of transmission modes supported by the base station includes transmission mode four (TM4) and transmission mode nine (TM9), and the UE determines that, within the plurality of candidate DCI formats, DCI format 2 corresponds to TM4 and that DCI format 2C corresponds to TM9.

16. The one or more non-transitory computer-readable media of claim 12, wherein the operations further comprise:
   determining a signal quality measurement associated with a signal strength and/or signal quality of signals received by the UE from the base station; and
   transmitting the signal quality measurement to the base station, such that the base station selects the particular transmission mode for subframes of a subsequent radio frame based at least in part on the signal quality measurement.

17. The method of claim 1, wherein the plurality of transmission modes supported by the base station is indicated in an antenna information field of the RRC message.

18. The method of claim 1, wherein performing the at least one blind search comprises:
   searching, by the UE at the physical layer, for the unique identifier in the DCI using a first DCI format of the plurality of candidate DCI formats; and
   searching, by the UE at the physical layer, for the unique identifier in the DCI using a second DCI format of the plurality of candidate DCI formats,
   wherein the UE determines that the unique identifier was found using the second DCI format and was not found using the first DCI format, and
   wherein the UE identifies the particular transmission mode as a first transmission mode, of the plurality of transmission modes supported by the base station, that corresponds to the second DCI format.

19. The UE of claim 7, wherein performing the at least one blind search comprises:
   searching, at the physical layer, for the unique identifier in the DCI using a first DCI format of the plurality of candidate DCI formats; and
   searching, at the physical layer, for the unique identifier in the DCI using a second DCI format of the plurality of candidate DCI formats,
   wherein the UE determines that the unique identifier was found using the second DCI format and was not found using the first DCI format, and
   wherein the UE identifies the particular transmission mode as a first transmission mode, of the plurality of transmission modes supported by the base station, that corresponds to the second DCI format.

20. The one or more non-transitory computer-readable media of claim 12, wherein performing the at least one blind search comprises:
   searching, at the physical layer, for the unique identifier in the DCI using a first DCI format of the plurality of candidate DCI formats; and
   searching, at the physical layer, for the unique identifier in the DCI using a second DCI format of the plurality of candidate DCI formats,
   wherein the UE determines that the unique identifier was found using the second DCI format and was not found using the first DCI format, and
   wherein the UE identifies the particular transmission mode as a first transmission mode, of the plurality of transmission modes supported by the base station, that corresponds to the second DCI format.

* * * * *